United States Patent Office 2,736,573
Patented Feb. 28, 1956

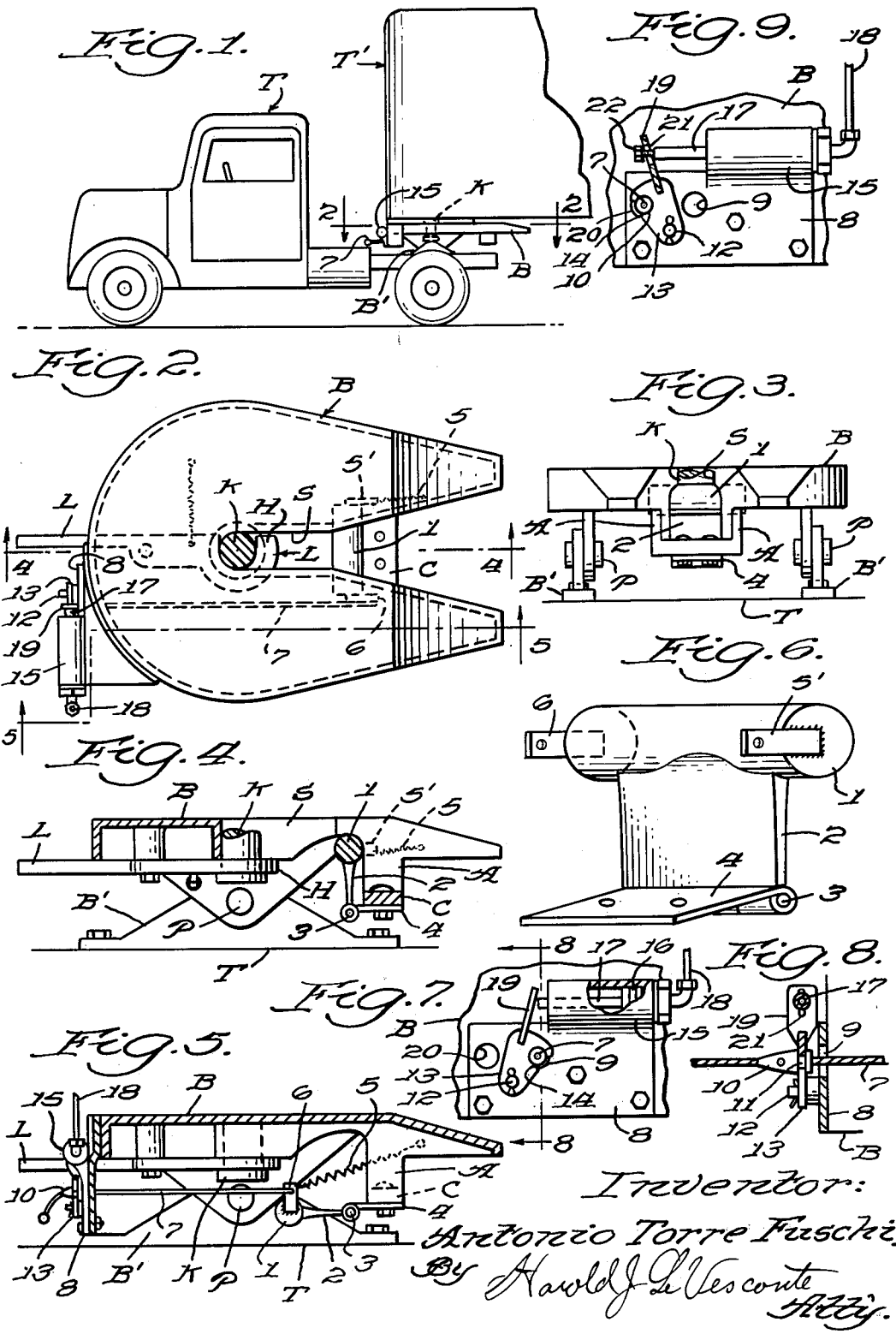

2,736,573
TRACTOR-TRAILER FIFTH WHEEL COUPLING SAFETY MEANS

Antonio Torre Fuschi, Los Angeles, Calif.

Application January 21, 1955, Serial No. 483,404

5 Claims. (Cl. 280—432)

This invention relates to automotive transport equipment and more particularly to an improved means for preventing the accidental uncoupling of a tractor and trailer. In my prior application Serial No. 380,913, filed September 18, 1953, there is disclosed a form of my invention applied to tractor and trailer combinations adapted for automatic coupling in which the king pin of the connection is mounted on the tractor. From certain aspects the present invention embodies a means for the same function but adapted for those manually coupled combinations in which the king pin depends from the under side of the trailer and in which the locking means is manually disabled to permit the king pin engaging slot on the tractor to move past the king pin and to the end of the slot after which the locking means is released to hold the king pin locked in place. As in the said prior application, the present invention is not concerned with the primary king pin locking means, but with a means which is constantly operative to prevent the king pin from coming out of the slot in which it is secured in the event that the primary locking means should fail. Also in the said prior application, the invention comprises a pressure cylinder and a latch means operated thereby both of which are separately mounted on the trailer. The present invention is an improvement on that earlier construction in that, first, the cylinder and latch are both mounted on a bracket in proper cooperative relation to each other and, second, in that by merely changing the position of the latch means on the bracket, the assembly is rendered available for use with vacuum braking apparatus.

Thus, the principal objects of the invention are to provide an uncoupling preventing means for use with tractor-trailer combinations which is adaptable for use with either pressure or vacuum operated braking systems; to provide an uncoupling preventing device for tractor-trailer combinations which is adapted for use on combinations in which the king pin is mounted on the trailer; and to provide an uncoupling preventing device including a releasing latch means which is connected to the braking system of the trailer and which is formed as a single unit to facilitate installation and servicing.

With the foregoing objects in view, together with such additional objects and advantages as may subsequently appear, the invention resides in the parts, and in the construction, combination and arrangement of parts described, by way of example, in the following specification of a satisfactory mode of execution of the invention; reference being had to the accompanying drawings which form a part of said specification and in which drawings:

Fig. 1 is a side elevation of a tractor and a portion of of a trailer attached thereto to which the present invention is applied, Fig. 2 is an enlarged, top plan view, partly in section, taken on the line 2—2 of Fig. 1, Fig. 3 is an elevational view of the right hand end of Fig. 2; the figure being rotated clockwise 90° for viewing in the position shown in Fig. 1, Fig. 4 is a sectional view taken on the line 4—4 of Fig. 2 showing the trailer king pin locked in the tractor bolster plate and showing the uncoupling preventing means in operative position to prevent uncoupling of the tractor and trailer, Fig. 5 is a sectional view taken on the line 5—5 of Fig. 2 showing additional details of the invention and showing the uncoupling preventing means as rendered inoperative incident to the coupling or uncoupling of a tractor and trailer, Fig. 6 is a further enlarged perspective view of the portion of the invention which acts to prevent escape of the trailer king pin from its slot in the tractor bolster plate, Fig. 7 is a front elevation of the latch and latch releasing component of the invention, Fig. 8 is a sectional view taken on the line 8—8 of Fig. 7, and Fig. 9 is a view similar to Fig. 7 but showing the parts of the component arranged for use with a vacuum operated braking system.

Referring first to Fig. 1 there is shown a tractor T coupled to a trailer T'; said tractor having a bolster plate B and the trailer having a depending king pin K which (see Fig. 2) is secured in a rearwardly extending slot S in the bolster plate by a manually operated locking lever L having a hooked end H embracing the king pin and holding it in place in the slot S. Referring to Figs. 3, 4 and 5, it will be noted that the bolster plate is pivotally mounted on a supporting base B' on the tractor by hinge pins P, P. All of the foregoing is standard construction for equipment of this type and no claim is made to such construction.

The present invention comprises a latch bar 1 having a depending arm 2 by which it is hingedly mounted at 3 to a bracket 4 bolted to the under side of the cross bar C which interconnects the ends of the bolster plate B adjacent the rear end of the slot S. The hinge 3 is disposed at right angles to the length of the slot and the latch bar is of such length that when in vertical position as shown in Figs. 3 and 4, it engages the forward sides of the depending arms A, A which interconnect the cross bar C with the sides of the bolster plate B. A tension spring 5 having one end attached to the bolster plate and the other end to an ear 5' at one end of the latch bar 1 serves normally to hold the latch bar in the said vertical position. When in this position, even though the locking lever L be released, the king pin K cannot escape from the slot S. Incident to coupling of the tractor to the trailer, as the tractor backs under the trailer, the king pin will contact the latch bar if it be in the said vertical position and swing it in a counterclockwise direction as viewed in Fig. 4 until it moves beyond the path of the latch bar at which time the spring 5 will bring the latch bar back to vertical position. The end of the latch bar opposite the end carrying the ear 5' carries a second ear portion 6 which is connected to one end of a cord 7 extending forwardly therefrom beneath and beyond the forward end of the bolster plate. By pulling on this cord, the latch bar may be swung down to the position shown in Fig. 5 clear of the path of the king pin to allow the king pin, when unlocked, to move out of the slot S or rather to allow the bolster plate to move forwardly past the king pin incident to uncoupling the tractor and trailer.

Mounted on the front edge of the bolster plate at one side of the center line thereof is a bracket plate 8 having a hole 9 therethrough which the end of the cord 7 extends. Mounted on the cord is a sleeve member 10 having a circumferential groove 11 formed therein; said member being so positioned on said cord that when the latch bar 1 is pulled down as shown in Fig. 5, the groove 11 will be located just forwardly of the front face of the bracket plate 8. Pivotally mounted on the front face of the bracket plate 8 by means of a pivot pin 12 is a swinging latch member 13 having a notch 14 in a side edge thereof engageable with the groove 11 to hold the cord 7 in position to disable the latch bar from operating as shown in Fig. 5. Mounted on the bracket plate 8 is a cylinder 15 having a piston 16 and piston rod 17 slidable therein; said cylinder having a closed head connected by a line 18 to the tractor braking system. The latch member 13 carries an arm 19 which is disposed in the path of movement of the piston rod 17 when the piston is moved outwardly by the application of pressure through the line 18 and the notch 14 in the latch member is so disposed that the swinging of the latch member 13 by the piston rod will cause it to disengage from the groove 11 and thus release the cord 7 permitting the spring 4 to restore the latch bar 1 to operative position.

Thus when the tractor is uncoupled from one trailer the latch bar must be moved to inoperative position to allow the uncoupling to be effected. As the tractor is connected to another trailer or re-connected to the same trailer and the trailer brake lines connected, the application of braking pressure will actuate the device to release the latch bar which will then remain in position to prevent accidental uncoupling. Uncoupling can be effected only by first moving the latch bar to inoperative position and locking it in that position by the latch member which is released upon the first application of braking pressure to the trailer brakes.

The above described embodiment of the invention is applicable to tractors and trailers employing brakes actuated by positive pressure. However, by a simple rearrangement of the parts, the device is also usable with vehicles having vacuum operated brakes as shown in Fig. 9. For this use of the device the bracket 8 is provided with a second cord receiving hole 20. The latch member 13 is removed from the pivot pin 12 and replaced in the reversed position and in this position, the notch 14 is movable toward and away from the hole 20. The arm 19 of the latch member is initially provided with a slot 21 and the outer end of the piston rod 17 is initially provided with an axially disposed threaded hole. A screw 22 is inserted through the slot 21 and threaded into the end of the piston rod with the head of the screw spaced from the end of the piston rod as shown in Fig. 9. The cord 7 and sleeve member 10 is led through the hole 20 and pulled to move the latch bar 1 to inoperative position after which the latch member 13 is swung to the left as viewed in Fig. 9 to engage the sleeve member 10 locking the latch bar in inoperative position. In this movement of the latch member the engagement between the head of the screw 22 and the arm 19 of the latch member pulls the piston and piston rod toward the open end of the cylinder. Upon the application of brakes the creation of a vacuum in the cylinder will permit atmospheric pressure to move the piston and piston rod to the right as viewed in Fig. 9 with resultant release of the cord 7 by the latch member and consequent movement of the latch bar 1 to operative position.

Thus the above described invention accomplishes two very desirable advances over the form thereof disclosed in my said co-pending application. First, the invention is usable on those coupling devices in which the king pin is on the trailer instead of on the tractor. Second, the latching and latch releasing means are conveniently mounted on a common bracket which facilitates installation and servicing and further, facilitates the adaptation of the invention to either pressure or vacuum operated brakes. In this respect, this improvement is not limited to use with trailers having the king pin component of the coupling means, but may be employed with equal advantage with coupling means in which the king pin component is on the tractor as shown in my said co-pending application.

It is appreciated that in the light of the foregoing description, changes and modifications may suggest themselves to others skilled in the art. Therefore, the invention is not to be deemed to be limited to the exact form above disclosed by way of example and it will be understood that the invention embraces all such modifications and changes in the parts and in the construction, combination and arrangement of parts as shall come within the purview of the appended claims.

I claim:

1. The combination with a coupling means for a tractor and trailer including a depending king pin on the trailer and king pin receiving means on the tractor comprising a king pin guiding slot and releasable means for locking the king pin in the receiving means, of means for preventing the accidental uncoupling of the vehicles; said uncoupling preventing means comprising a hingedly mounted bar and spring means normally moving said bar upwardly to a position blocking exit of the king pin from the slot; said bar being momentarily displaceable on said hinged mounting against the bias of said spring means by entry of the king pin into the slot incident to coupling of the vehicles together, manually operable means for moving said bar out of the path of the king pin when moving out of the slot incident to intended uncoupling of the vehicles, a latch means manually operable to retain said bar moving means in position to hold said bar out of the path of the king pin against the bias of said spring means, and means connected to the vehicle braking system effective upon energization of the braking system to move said latch means to release said bar holding means with resultant return of said bar to exit blocking position by said spring means.

2. The combination with coupling means for a tractor and trailer including a king pin on the trailer and king pin receiving means on the tractor comprising a bolster plate having a king pin guiding slot and releasable means for locking the king pin in the slot, of means for preventing the accidental uncoupling of the trailer from the tractor; said uncoupling preventing means comprising a bar hingedly mounted for movement about a horizontal axis disposed below the path of movement of the king pin along the slot, yieldable means for maintaining said bar across the slot and in the path of movement of the king pin therein; said yieldable means being constructed and arranged to permit momentary displacement of said bar by the king pin incident to movement thereof in the slot in coupling the tractor and trailer, manually operable means for moving said bar out of the path of movement of the king pin against the effort exerted by said yieldable means, a latch manually movable to secure said bar moving means in position holding said bar out of said path, and means connected to and actuated upon initial energization of the connected tractor and trailer braking system effective to move said latch to release said bar moving means with consequent return of said bar into movement obstructing position in the path of movement of the king pin by said yieldable means.

3. An uncoupling preventing means as claimed in claim 2 in which the braking system connected means and latch are arranged for optional assembly to accommodate either a pressure actuated or a vacuum actuated braking system including a cylinder connected to the braking system and having a piston and a piston rod carried by the piston and projecting from the cylinder; said piston and piston rod being moved in one direction when said cylinder is subjected to vacuum and in the opposite direction when subjected to pressure and the distal end of said piston rod operatively engaging said latch for movement of said latch upon braking system induced movement of said piston; said latch being mounted on a pivot and said mounting permitting assembly of said latch thereon in either of two positions to effect release of the bar holding means by said braking system induced movement of said latch.

4. An uncoupling preventing means as claimed in claim 3 in which said bar holding means comprises a flexible member having one end thereof attached to said bar and in which said base member is provided with a pair of openings through either of which said flexible member may be extended, a sleeve longitudinally adjustably fixed on said flexible member and having an external latch engaging groove, a pivot for said latch carried by said base member and disposed between said openings, a notch on one edge of said latch engageable with said groove; said latch being optionally mountable on said pivot with either side of said latch disposed adjacent to said base member with resultant location of said notch in cooperative relation to one or the other of said openings.

5. An uncoupling preventing means as claimed in claim 1 in which said latch means includes a base member mounted on the tractor having a pair of openings extending therethrough and means for pivotally mounting a latch member disposed between said openings, a latch member mounted on said means and having a notched edge; said latch member being optionally positionable on said mounting means with said notched edge disposed adjacent one or the other of said openings, and in which said bar holding means includes a flexible member having one end attached to said bar and thence extending through the one of said openings adjacent to said notched edge and carrying a collar having a groove positioned to be engaged by said notched edge when said bar is moved out of the path of said king pin by said flexible member, and in which said pressure responsive means includes a cylinder connected to the vehicle braking system, a piston reciprocable in said cylinder carrying a piston rod movable in a line intersected by a portion of said latch member and engaging said portion; said pressure responsive means, when connected to a pressure actuated braking system causing resultant projection of said piston rod from said cylinder and consequent movement of said latch in one direction, and when connected to a vacuum actuated braking system, causing said piston rod to be drawn into said cylinder, and means connecting said latch to said piston rod when used with a vacuum system; said flexible member being led through to one of said openings from which said notched edge of said latch member is moved according to the system with which the uncoupling preventing means is used.

References Cited in the file of this patent

UNITED STATES PATENTS

| | | |
|---|---|---|
| 2,258,432 | Winn | Oct. 7, 1941 |
| 2,317,508 | Zoder | Apr. 27, 1943 |
| 2,667,364 | Colpo | Jan. 26, 1954 |